E. KREHER.
THRUST BEARING.
APPLICATION FILED SEPT. 16, 1910.
1,036,270.
Patented Aug. 20, 1912.
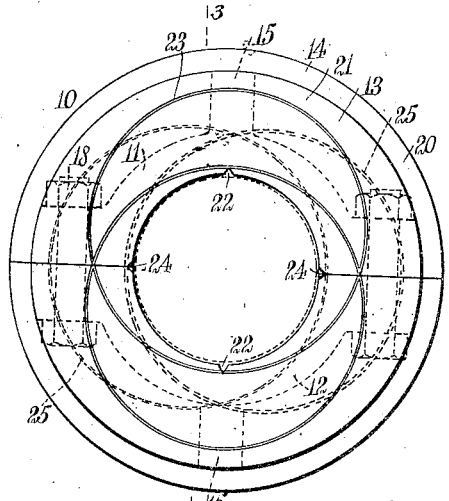
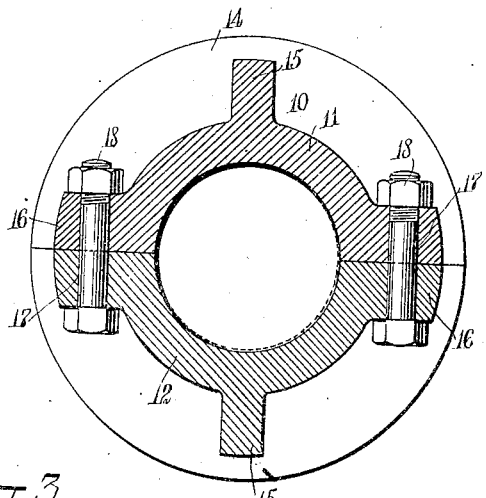
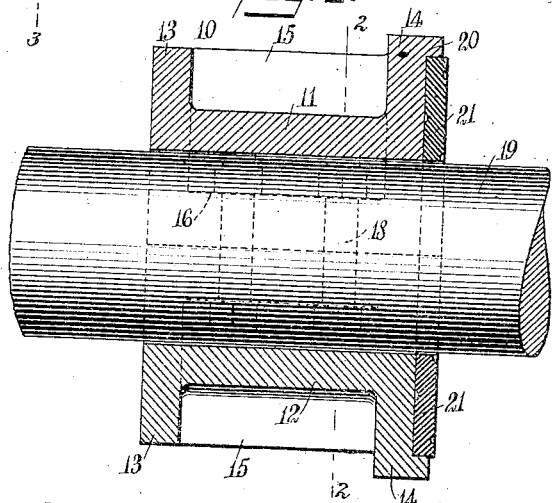
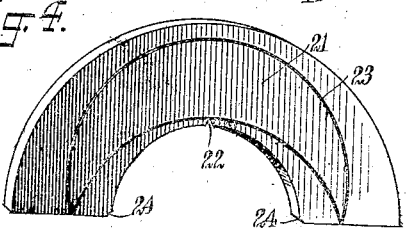
WITNESSES:
INVENTOR
Ernest Kreher
BY
ATTORNEYS

UNITED STATES PATENT OFFICE.

ERNEST KREHER, OF TAMPA, FLORIDA.

THRUST-BEARING.

1,036,270.

Specification of Letters Patent. Patented Aug. 20, 1912.

Application filed September 16, 1910. Serial No. 582,309.

*To all whom it may concern:*

Be it known that I, ERNEST KREHER, a citizen of the United States, and a resident of Tampa, in the county of Hillsboro and State of Florida, have invented a new and Improved Thrust-Bearing, of which the following is a full, clear, and exact description.

This invention relates to thrust bearings for use in connection with prime movers, pumps and other machines, and has reference more particularly to a thrust bearing which comprises a removable collar adapted to receive a shaft, and having at the end an annular recess, about the shaft, and bearing washers located in the recess and adapted to receive end thrust from an adjacent machine part.

The object of the invention is to provide a simple, strong and efficient thrust bearing which can be used with centrifugal pumps, prime movers and other machines, which can be conveniently located between machine elements, which when so located can be easily removed and replaced without disturbing the machine elements, in which the bearing members receiving directly the end thrust are securely held in place, and in which the bearing members are so constructed that thorough lubrication can be effected.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is an end elevation of an embodiment of my invention; Fig. 2 is a transverse section of the bearing, on the line 2—2 of Fig. 3; Fig. 3 is a longitudinal section of the bearing, showing the same in place upon a shaft; and Fig. 4 is a perspective view of one of the bearing washers.

Before proceeding to a more detailed explanation of my invention it should be clearly understood that while the thrust bearing is particularly useful in connection with machines such as centrifugal pumps, it can also be advantageously employed under other circumstances, where it is necessary to take up end thrust upon a suitable bearing. I prefer to fashion the bearing members or washers from brass, but any other material adapted for the purpose can also be employed. Certain of the details of construction, shown for example herewith, form no part of the invention and can be varied in accordance with individual preference and special conditions, without departing from the underlying spirit of the invention.

Referring more particularly to the drawings, I employ a collar 10, comprising two halves or sections 11 and 12, which are of substantially semi-cylindrical cross section. Each section, at the ends, has annular flanges 13 and 14, which are radially extended and are connected by strengthening ribs 15. The sections 11 and 12 have at the longitudinal edges, flanges 16 adapted to engage when the sections are assembled, and having registering openings 17 therethrough which receive retaining and clamping bolts 18, by means of which the collar is secured upon a shaft 19 or the like.

The end flanges 14 of the collar sections have at the peripheral edges, extensions 20, disposed in the direction of the length of the collar and forming about the central opening of the collar an annular recess which is concentric with the shaft 19 or other member upon which the collar is secured. I employ bearing members 21 each of semi-annular form, and forming together, a bearing ring. The ring projects slightly beyond the flange extensions 20, as is shown in Fig. 3, and receives the end thrust of an adjacent machine part.

The bearing members have at the inner edge, substantially midway between the ends, grooves 22. On the outer faces the members have circular grooves 23 which, when the bearing members are assembled, form two intersecting circles, eccentric with the bearing ring. The circles intersect at the junction of the two members, as is shown in Fig. 1, and each also intersects one of the grooves 22. The members 21, at their inner edges, have notches 24, which when the members are assembled form grooves intersecting lubricant grooves 25 at the rear or inner faces of the members 21, and indicated in dotted outline in Fig. 1.

Having thus described my invention, I claim as new, and desire to secure by Letters Patent:

1. A thrust bearing, comprising a collar formed of semi-cylindrical sections having end flanges and at their longitudinal edges apertured flanges, one end flange having on its outer face an annular recess concentric with the opening thereof, a sectional bearing ring fitting in the recess of the end flange of the collar with a portion projecting beyond the face of the said flange, said ring having grooves in the wall of the opening at the abutting portions of the sections and midway between said portions and eccentric circular grooves on each face, the grooves on one face intersecting each other at the abutting portions of the sections and connected with the grooves midway between said abutting portions, and the grooves on the other face intersecting each other midway between the abutting portions and connected with the grooves at the said abutting portions, and bolts passing through the apertured flanges of the collar and clamping the sections of the collar together and the bearing ring in the recess of said collar.

2. A thrust bearing, comprising a collar formed of two semi-cylindrical sections having end flanges and at their longitudinal edges apertured flanges, one end flange having on its outer face an annular recess concentric with the opening thereof, a sectional bearing ring fitting in the recess of the end flange of the collar, said ring being provided with grooves in the wall of its opening and with grooves in its faces communicating with the first named grooves, and bolts passing through the apertured flanges of the collar and clamping the sections of the collar together and the sectional bearing ring in the recess of said collar.

In testimony whereof I have signed my name to this specification in the presence of two subscribing witnesses.

ERNEST KREHER.

Witnesses:
JOSEPHINE CARROLL,
C. FRED THOMPSON.